United States Patent
Retterer et al.

(10) Patent No.: US 7,637,017 B2
(45) Date of Patent: Dec. 29, 2009

(54) TOOL FOR CUTTING STRUCTURAL MATERIALS

(75) Inventors: Todd Retterer, Edison, OH (US); Donald Drown, Bucyrus, OH (US)

(73) Assignee: Midwest Tool and Cutlery Company, Sturgis, MI (US)

( * ) Notice: Subject to any disclaimer, the term of this patent is extended or adjusted under 35 U.S.C. 154(b) by 194 days.

(21) Appl. No.: 11/683,077

(22) Filed: Mar. 7, 2007

(65) Prior Publication Data

US 2007/0209215 A1 Sep. 13, 2007

Related U.S. Application Data

(60) Provisional application No. 60/780,278, filed on Mar. 8, 2006.

(51) Int. Cl.
*B26B 13/04* (2006.01)

(52) U.S. Cl. .......................................... 30/241; 30/278

(58) Field of Classification Search ................... 30/241, 30/358, 175–193, 208, 278
See application file for complete search history.

(56) References Cited

U.S. PATENT DOCUMENTS

| | | | | | |
|---|---|---|---|---|---|
| 674,088 | A | * | 5/1901 | Hoak | 30/176 |
| 1,778,791 | A | * | 10/1930 | Brant et al. | 30/183 |
| 4,407,174 | A | * | 10/1983 | Schulze | 81/9.42 |
| 4,700,592 | A | * | 10/1987 | Rommel | 81/355 |
| 5,957,015 | A | * | 9/1999 | Jackson | 29/274 |
| 6,612,147 | B2 | * | 9/2003 | Beetz et al. | 72/409.16 |
| 6,658,738 | B1 | * | 12/2003 | King | 30/258 |

OTHER PUBLICATIONS

Retterer 2007 Vinyl and Aluminum Fence Tools Catalog, Professional Edition, pp. 7 and 9 (Partial) Showing Tools Having Non-Detachable Heads for Cutting Structural Materials.
Triple S Vinyl Sales, Inc. Undated Pamphlet for an Aluminum Clipper Tool.
Retterer 2007 Vinyl and Aluminum Fence Tools Catalog, Professional Edition, pp. 7 and 9 (Partial) Showing Tools Having Non-Detachable Heads for Cutting Structural Materials, Nov. 2005.
Triple S Vinyl Sales, Inc. Undated Pamphlet for an Aluminum Clipper Tool, Jun. 2004.

* cited by examiner

*Primary Examiner*—Stephen Choi
(74) *Attorney, Agent, or Firm*—James R. Eley; Michael A. Forham; Eley Law Firm Co.

(57) ABSTRACT

A clipper with a cutting head and having an actuator. The heads contain a structural profile-specific channel into which structural material having the profile for which the head is designed is inserted and clipped. The head is designable for various structural profiles and, in one embodiment, multiple heads are interchangeably operated by a single actuator. In the interchangeable embodiment, a release button having two sections of differing diameters is disposed in the actuator and communicates with a connector slot of the head to permit attachment and detachment of the head from the actuator. The structure-specific clipper increases the quality of cuts and decreases the amount of deformation caused to the material. The clipper reduces buildup of waste material by ejecting cuttings from the head upon clipping.

14 Claims, 13 Drawing Sheets

TOOL FOR CUTTING STRUCTURAL MATERIALS

This application claims priority to U.S. provisional application 60/780,278, filed Mar. 8, 2006, the contents of which are hereby incorporated by reference.

FIELD

The present invention relates generally to hand tools for cutting materials. In particular, the present invention relates to a handheld, manually actuated clipper for cutting structural material.

BACKGROUND

Handheld, manually actuated cutting devices are common in the art for cutting materials ranging from paper and fabrics to wood and metal. These devices, or tools, comprise such common forms as scissors for cutting paper or fabrics, clippers for cutting hedges or tree limbs and snips, punches or nibblers for cutting thin sheet metal, among an array of others. Forms of such devices are also used for piercing, nibbling, trimming, clipping, among a wide range of other applications in addition to cutting.

Such devices typically have two pivotally connected members that comprise handles along a first end and cutting members at or near a second end. The connection between the members is typically provided by a fulcrum generally located so as to provide mechanical advantage to the user of the device, especially in applications where materials such as wood or metal are to be cut. Designs may be tailored to provide a sufficient amount of mechanical advantage for a given application by altering the distances between the cutting members, the fulcrum and the handles.

The cutting members of the cutting devices in the art are also wide ranging. They may comprise one or more opposing wedge shaped surfaces or blades, for cutting or they might utilize a plurality of opposing surfaces moving in opposite directions to shear a section of material.

The pivotal connection between the members can be designed in various configurations as well. The configurations range from a simple pin between two members allowing pivotal movement to more complex compound action mechanical devices having multiple interconnecting members, pivot points and movements.

A major area for application of cutting devices or tools is the construction industry. Tools of all types, sizes and configurations are utilized to cut, pierce, nibble, clip and shear a wide variety of materials. One segment of the construction industry that employs a number of cutting tools is the fence installation business. Handheld cutting tools are used by workers in the process of assembling and installing metal and vinyl fencing. Cutting tools such as notchers, nibblers, end clippers and even saws, are commonly used in the field to prepare fencing sections for assembly by bending, forming, notching and/or cutting the fence sections to obtain a desired length or to form couplings, such as rail end steps. Handheld cutting tools are ideal for such functions due to their ease of use, portability, small size, and specificity of function. Due to the wide variety of fencing components and materials, many different tools are often necessary.

The materials employed in commercial, industrial and residential fencing typically comprise sections of aluminum or vinyl rails, slats, and posts among others, including preassembled panels of fencing components. The sections of structural material are often formed with unique cross-sectional profiles to provide aesthetic exterior appearances or structural strength, among other properties. Additionally, the profiles may include interior channels, or ribs, such as a "J" section, to strengthen and allow connectivity between sections, among other uses. There are many unique profiles available in the field and typically each manufacturer will produce its own unique profiles. Often, sections of the materials, whether they be preassembled panels or single components, must be cut to length in the field and the ends clipped or notched to provide a suitable coupling for joining the sections together. Couplings, such as rail end steps, generally comprise a small section or notch that is clipped from along an edge at the end of the fencing section to allow the sections to mate with a fence post. It is desirable to make the couplings with tight tolerances and without bending or deforming the remaining material in order to permit a tight connection between mating members of the fence and to produce an aesthetic appearance to the coupling. To do so, the cut should generally provide a sharp, square perimeter around the cut without unduly bending or deforming the remaining material. Producing such a cut typically requires that the material be well supported during the cut to reduce deformation and to keep the cutting blade correctly aligned with the material during the cut. Thus, each different profile of fencing material can require different tools to make the cuts and to produce quality joints.

The function-specific aspects of handheld tools in the art can be advantageous in providing tools specifically designed to fit a given application or material and thereby produce a good quality, clean cut or clipping. For example, the tool can be designed to produce a sharp, square cut on a specific section of material such as a fence rail having internal channels, without causing unwanted deformation to the material.

The function specificity of hand tools may also serve as a drawback for several reasons. The function-specific qualities of the tools limits their practical use, i.e., they can not be used, or are difficult to use, in other applications involving different materials or proprietary material shapes, among others. Thus, a single tool may be dedicated to a single task thereby requiring a worker to carry multiple tools for completing each of a variety of different tasks. Further, durable, high quality tools are oftentimes very expensive, which can be a financial burden to a worker or business when a large number of specialty tools are needed to properly complete a job.

There is a need for a clipper that can produce a high quality, clean cut that is easily adaptable to multiple specific functions, materials and material profiles, and has sufficient durability for extended and repeated uses. There is also a need for a clipper that can produce a high quality, clean cut for a specific material and material profile and has sufficient durability for extended and repeated uses. There is a further need for a cutting tool that can be re-configured in the field to accommodate different functions, materials and material profiles without the resorting to additional tools.

SUMMARY

A clipper having interchangeable cutting heads is disclosed according to an embodiment of the present invention. The clipper comprises an actuator separate from the cutting head which enables the common actuator to be used with multiple interchangeable cutting heads. The cutting heads are designed to be compatible with specific structural material profiles and to provide clean cuts to those profiles without causing undue deformation to the surrounding material and structure. The interchangeability of the cutting heads permits a user to utilize one actuator for multiple applications and to reduce the number of tools they must carry while on a job. For example, a user can carry a single actuator and several different heads into the field rather than multiple, dedicated tools, thereby reducing the bulk and number of tools that must be transported. Also, a user may replace or purchase new cutting heads at a lower cost as compared to purchasing a complete, dedicated tool. The cutting heads are easily interchanged through the use of a release button, a slidable punch pin lever and guide pins without the need for additional tools. Components of the cutting head are retained therein to prevent the loss of loose components in the field.

Alternatively, the clipper may be produced without interchangeability of the heads in order to provide a unit adapted to clipping a single structural material profile. Such a unit maintains many of the advantages of the cutting mechanism of the present invention without the addition of clipper head interchangeability.

An object of the present invention is a tool for cutting structural materials. The tool comprises a guide plate having a pair of spaced-apart connector pins. A pair of handles, each handle including a connector plate, are movably coupled to the guide plate. A drive pin is pivotally coupled to the connector plates, the drive pin being movable generally linearly as the handles are pivoted. A detachable cutting head comprises a body that includes a channel configured to receive a structural material workpiece. A mounting flange is coupled to the body and includes a pair of spaced-apart apertures. Lastly, a cutting plate having a connector slot is slidably disposed in the body. The apertures of the mounting flange are configured to detachably engage the connector pins of the guide plate and the connector slot of the cutting plate is configured to detachably engage the drive pin. In addition, the cutting plate is configured to move slidably in the body as the handles are pivoted, effective to cut a structural material workpiece when the workpiece is inserted into the channel of the body.

Another object of the present invention is a method for cutting structural materials. The method comprises the steps of forming an actuator by pivotably coupling together a pair of handles with a drive pin, and detachably engaging apertures of a cutting head to corresponding connector pins of the actuator. A slidable cutting plate of the cutting head is detachably coupled to the drive pin of the actuator. Lastly, a structural material workpiece is inserted into a channel of the cutting head and the handles are pivoted such that the cutting plate moves slidably in relation to a body of the cutting head, thereby cutting the workpiece.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 3a is a front side elevational view of the head of the interchangeable clipper of FIG. 1 depicted detached from the actuator;

FIG. 3b is a left side elevational view of the head of the interchangeable clipper of FIG. 1 depicted detached from the actuator;

FIG. 3c is a rear side elevational view of the head of the interchangeable clipper of FIG. 1 depicted detached from the actuator;

DETAILED DESCRIPTION

Figure 1:
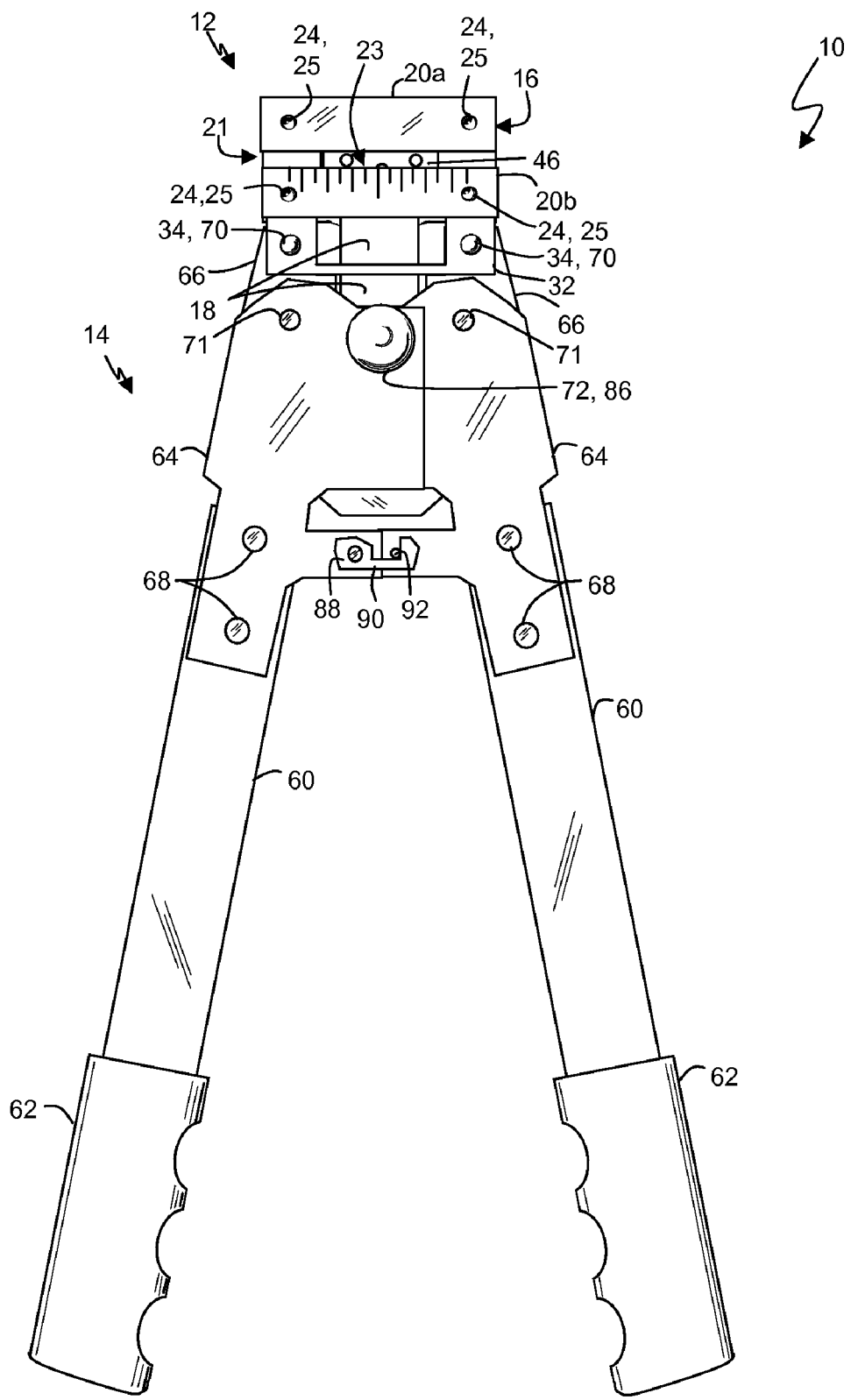
FIG. 1 is a front side elevational view depicting the general arrangement of components of an interchangeable clipper according to an embodiment of the present invention.
Figure 2:
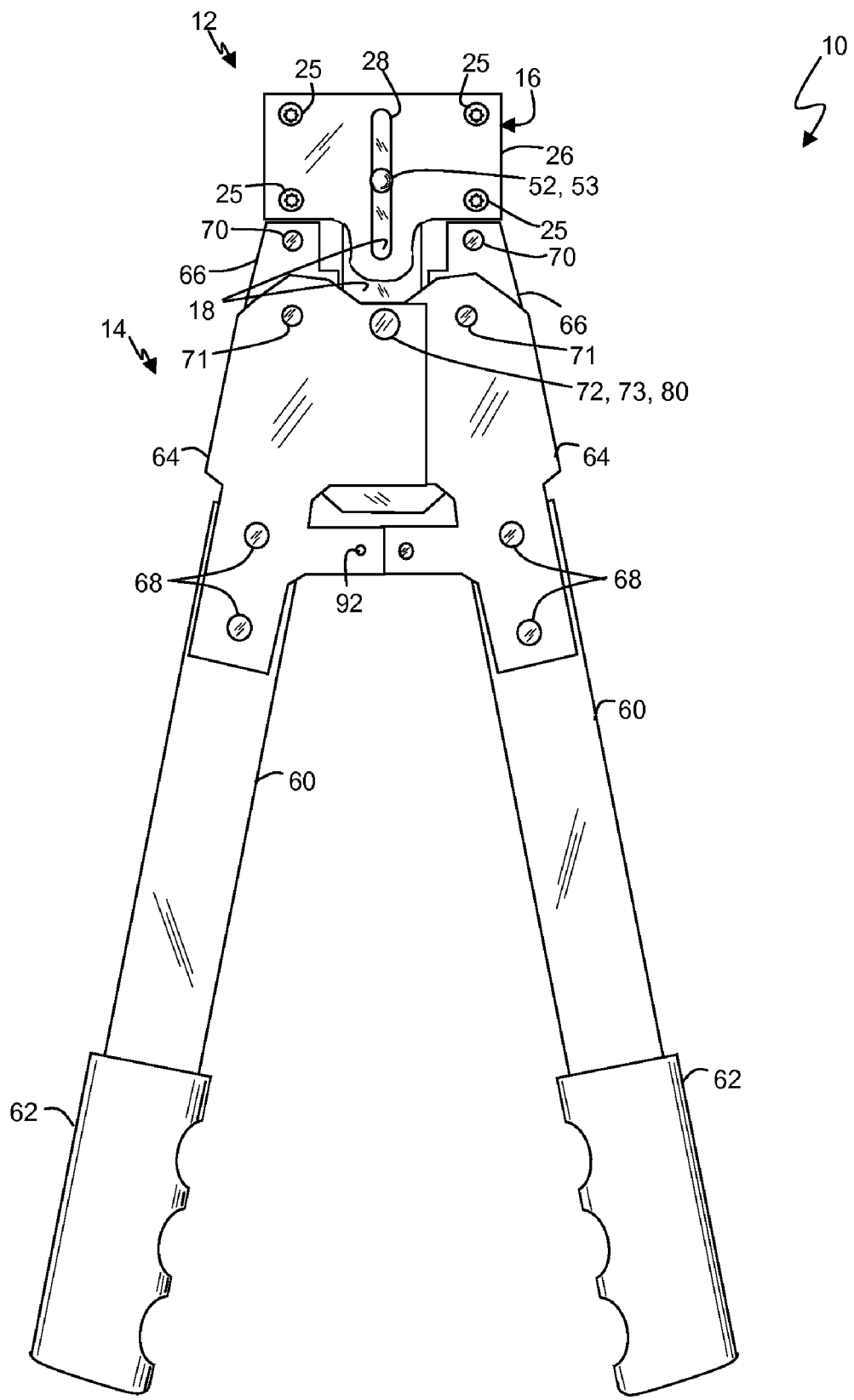
FIG. 2 is a rear side elevational view of the interchangeable clipper of FIG. 1.
Figure 3D:
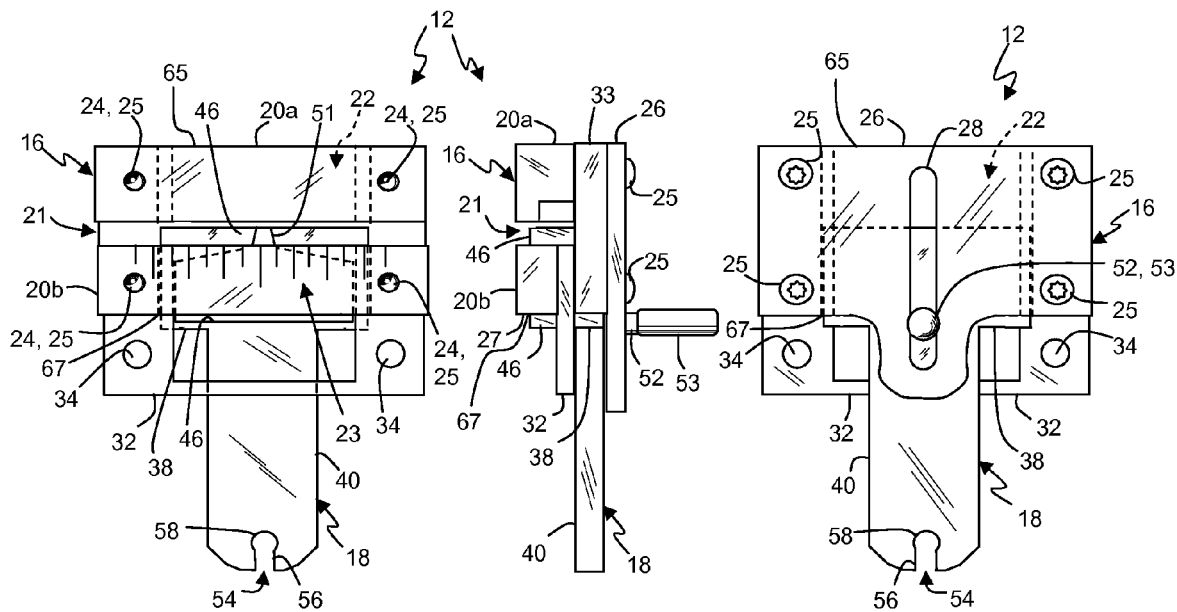
FIG. 3d is a top elevational view of the head of the interchangeable clipper of FIG. 1 depicting the location of a cavity through which the blade travels.
Figure 3D:
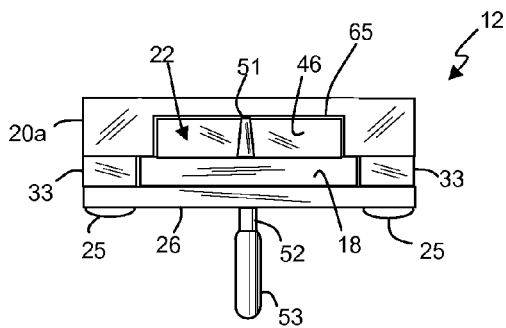
Figure 9:
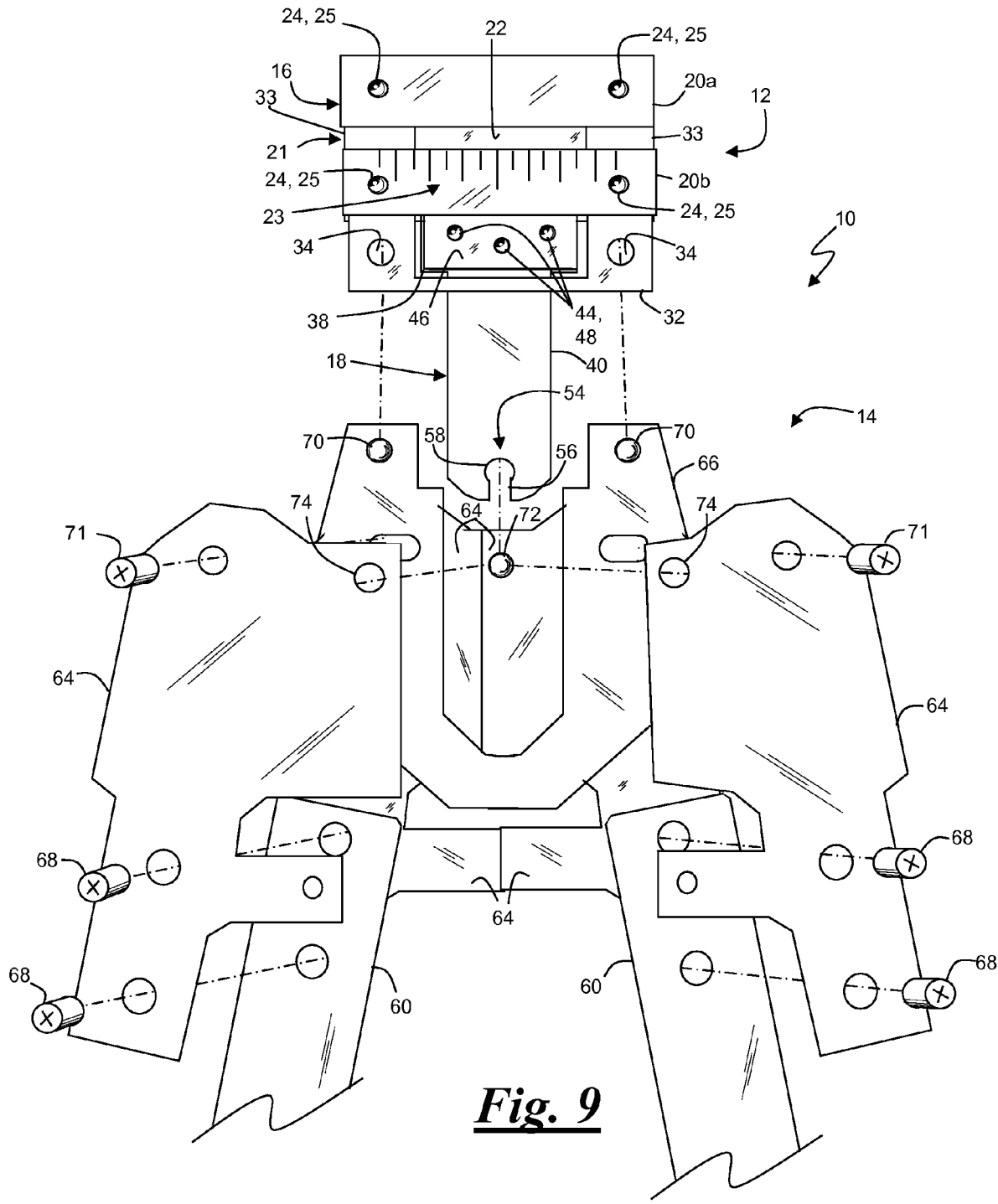
FIG. 9 is a front side, partially exploded view of the interchangeable clipper of FIG. 1 depicting the front connector plates removed for viewing the connections between the head and the actuator.

With reference to FIGS. 1 and 2 an interchangeable clipper tool (referred to interchangeably herein as "clipper" or "tool") 10 comprising a cutting head 12 and an actuator 14 is disclosed according to an embodiment of the present invention. Cutting head 12 further comprises a body 16 and a cutting plate 18 which together form the cutting mechanism for clipper 10, as depicted in FIGS. 3a-d. Body 16 is the housing in which the remaining components of cutting head 12 are disposed. Body 16 has at its front portion faceplates 20a and 20b. Faceplates 20a and 20b are aligned generally transverse to the longitudinal axis of clipper 10 and form a portion of a channel 21 into which material to be clipped is inserted (FIGS. 1, 3a and 3c). The alignment and cross-sectional profile of faceplates 20a and 20b is determinable by design such that channel 21 formed thereby can be configured to accept various material profiles (as described below). A portion of the rear side of faceplates 20a and 20b, intermediate their length, is removed to form a portion of a cavity 22 extending transverse to the length of the faceplates (FIGS. 3d and 9). Measurement graduations 23 may be included along a front portion of faceplate 20a and/or 20b to assist a user in determining the length of material to be clipped. Faceplates 20a and 20b also contain a plurality of apertures 24 through which fasteners 25 are inserted to attach the faceplates to other components of cutting head 12. Fasteners 25 may be any type of fastener including screws, rivets, and pins, among others, or a permanent form of bonding such as welding can be used.

Again referring to FIGS. 2, 3b-d and 5a, a back plate 26 is attached at the rear side of cutting head 12 by fasteners 25 inserted through apertures 30. Back plate 26 is generally rectangular in shape and forms the rear side of cavity 22. A slot 28 is disposed along a central portion of back plate 26 extending transverse to the width of cutting head 12. Slot 28 extends nearly the full height of back plate 26 and has a width suitable for accepting a punch pin lever 52 (described below).

Figure 5A:
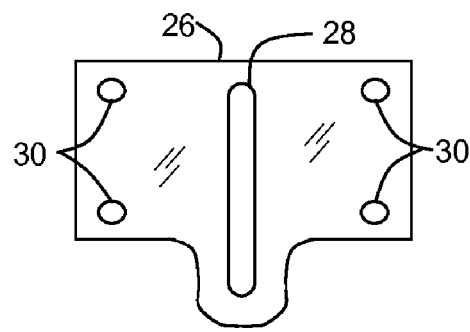
FIG. 5a is a rear side elevational view of the back plate of the interchangeable clipper of FIG. 1.
Figure 5B:
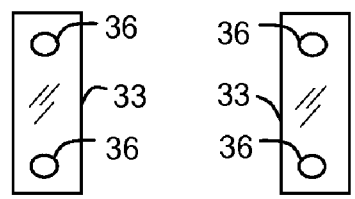
FIG. 5b is a front side elevational view of the spacer plates of the interchangeable clipper of FIG. 1.
Figure 5C:
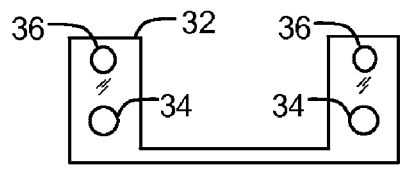
FIG. 5c is a front side elevational view of the guide pin plate of the interchangeable clipper of FIG. 1.
Figure 5D:
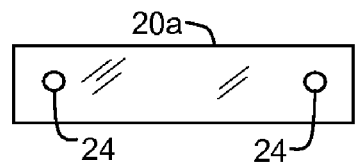
FIG. 5d is a front side elevational view of a faceplate of the interchangeable clipper of FIG. 1.
Figure 5E:
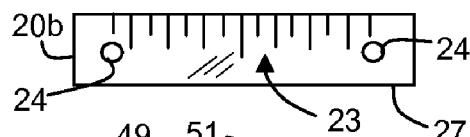
FIG. 5e is a front side elevational view of a faceplate of the interchangeable clipper of FIG. 1 depicting measurement graduations along its surface.

Between faceplates 20a and 20b and back plate 26 is disposed a guide pin plate 32, referred to interchangeably herein as a "guide pin plate" and a "mounting flange" (FIG. 5c) and spacer plates 33 (FIG. 5b), as depicted best by FIG. 3b. Guide pin plate 32 is typically located behind and adjacent to faceplate 20b and extends toward actuator 14 beyond the bottom surface of the faceplate. A bottom edge 27 of faceplate 20b may define the bottom portion of cavity 22. The extended portion of guide pin plate 32 contains apertures 34 for accepting guide pins 70 of actuator 14 (described below). Guide pin plate 32 can also have sections along its width removed to provide compatibility with cutting plate 18 (as described below). Spacer plates 33 and guide pin plate 32 provide appropriate spacing between faceplates 20a and 20b and back plate 26 to form channel 21 and cavity 22, as depicted by FIGS. 3a, 3b and 3d. Guide pin plates 32 and spacer plates 33 also contain apertures 36 for insertion of fasteners 25.

Figure 5F:
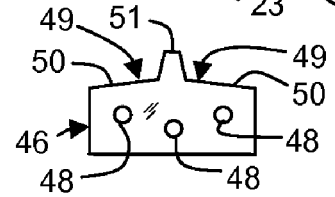
FIG. 5f is a front side elevational view of the blade of the interchangeable clipper of FIG. 1 depicting a stop feature.
Figure 5G:
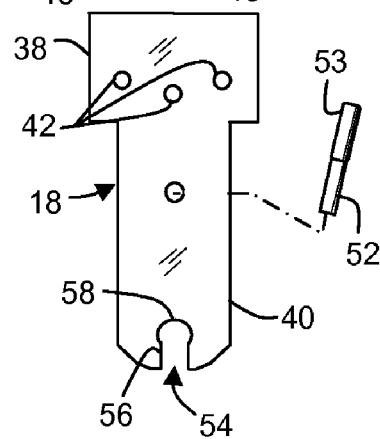
FIG. 5g is a front side elevational view of the cutting plate and associated punch pin lever of the interchangeable clipper of FIG. 1.

Cutting plate 18 further comprises a widened, generally rectangular section 38 along its upper area and a neck 40 extending downwardly therefrom, as displayed in FIG. 5g. Section 38 contains apertures 42 for accepting fasteners 44 by which a cutting blade 46 is attached to the section. Cutting blade 46 (FIG. 5f) also has apertures 48 for accepting fasteners 44. Cutting blade 46 is a generally rectangular component having a cutting surface 49 along its upper edge. Cutting surface 49 can have any desired design that will provide adequate cutting force and ability in a given application and typically is an angled surface creating a wedge shape and a leading cutting edge 50. Cutting surface 49 may extend across the full width of cutting blade 46 or a stop 51 can be located intermediate the width, as depicted in FIGS. 3a and 5f. Stop 51 is a portion of cutting blade 46 extending orthogonally from cutting surface 49 that forms an obstacle to the passage of material inserted into channel 21. Stop 51 assists a user in achieving material cuts of consistent predetermined length.

Neck 40 provides the connection between cutting plate 18 and actuator 14 for actuating clipper 10, as described below and depicted in FIGS. 9 and 10. Along the length of neck 40 is a punch pin lever 52 (FIGS. 3b-d and 5g). Punch pin lever 52 (referred to interchangeably herein as "punch pin lever" and "lever") interacts with slot 28 of back plate 26 to provide additional support, alignment and restriction of the movement of cutting plate 18 (as described below). Punch pin lever 52 can be any form of pin or element extending generally perpendicularly from the rear surface of neck 40 a sufficient distance to extend through back plate 26 and to provide adequate length for a user to grasp the punch pin lever and manipulate cutting plate 18. A rubber or plastic cap 53 may be inserted over punch pin lever 52 to provide comfort to a user during manipulation of the punch pin lever and for aesthetic appearances.

Referring again to FIGS. 3a, 3c and 5g, neck 40 also contains a connector slot 54 at its end opposite section 38. Connector slot 54 comprises a neck section 56 and a head section 58, forming a keyhole-shaped slot. Neck section 56 typically has a short length, about ¼ inch, but may be longer or shorter depending on a given design, and has a width smaller than the diameter of head section 58. Head section 58 is a generally circular region having a diameter greater than the width of neck section 56 and an open portion allowing communication of a release button 72 (described below) between the neck and head sections.

Figure 6A:
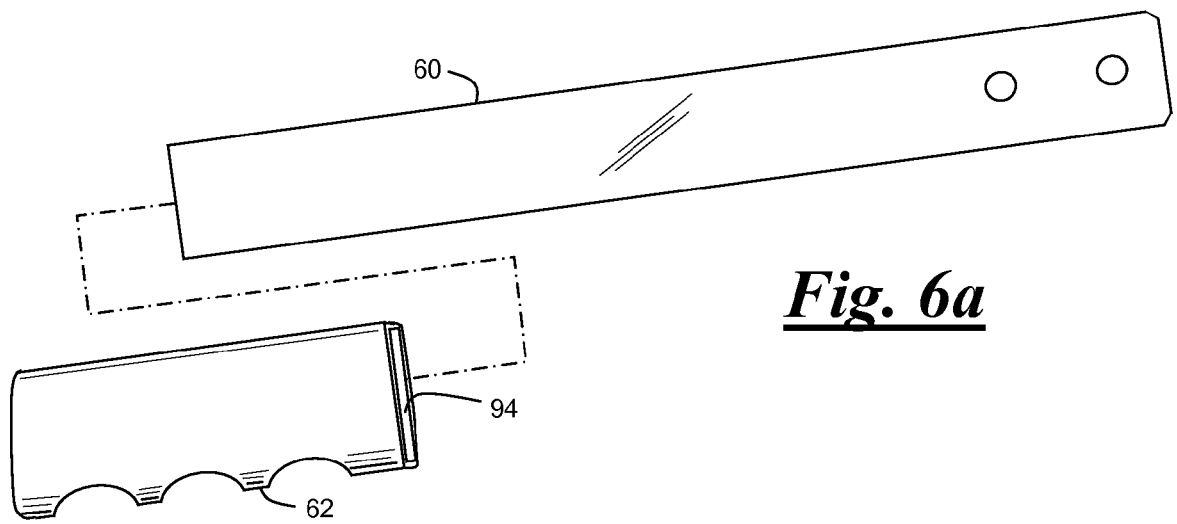
FIG. 6a is a front side view of a handle and grip of the interchangeable clipper of FIG. 1.

Referring now to FIGS. 1, 2 as well as 4a and 4b, actuator 14 further comprises handles 60, grips 62, connector plates 64 and a guide plate 66. Handles 60 extend from near cutting head 12 a distance sufficient to provide a desirable amount of mechanical advantage to a user for actuating clipper 10 (FIG. 6a). Grips 62 may be located on handles 60 along their extended ends to provide comfort and grip to a user during use and transport of clipper 10 (FIG. 6a). Grips 62 can be composed of any suitable material including rubber, plastic, metal or wood, among others or may be integrated into the shape of handles 60.

Figure 6B:
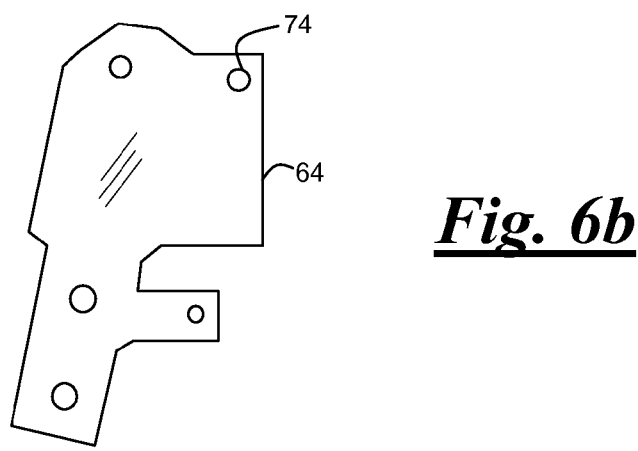
FIG. 6b is a front side elevational view of a connector plate of the interchangeable clipper of FIG. 1.

Connector plates 64 are attached along the top ends of handles 60 and interconnect handles and cutting plate 18, as depicted in FIGS. 1, 2 4a, and 4b. Typically, four connector plates 64 are utilized wherein each handle 60 is sandwiched between two connector plates. Attachment of connector plates 64 to handles 60 is provided by fasteners 68 which can be any form of fastener, including, but not limited to, rivets, screws, or bolts, or a bonding method such as welding, among others, can be utilized. Connector plates 64 can have any suitable shape and form desirable to provide appropriate mechanical connection between the associated components and to provide sufficient strength for operation of clipper 10 (FIG. 6b).

Figure 6C:
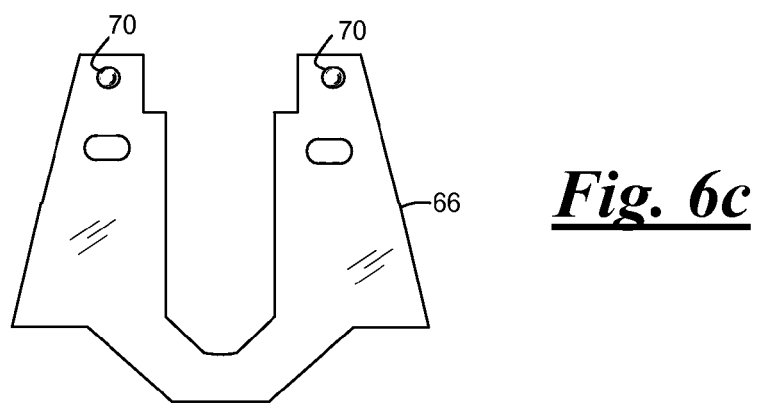
FIG. 6c is a front side elevational view of the guide plate of the interchangeable clipper of FIG. 1.

As displayed in FIG. 6c as well as FIGS. 1, 2, 4a, and 4b, guide plate 66 is generally U-shaped and is oriented such that the ends of the U-shape point upward and away from handles 60. Guide plate 66 provides guide pins 70 (referred to interchangeably herein as "guide pins" and "connector pins") extending perpendicularly from its front surface near its ends. Guide pins 70 generally comprise pins fixedly attached to guide plate 66 for linking with guide pin plate 32 via apertures 34 (described below). Guide plate 66 is rotatably attached to and disposed between each set of connector plates 64 with fulcrum pins 71 inserted through the guide plate and the connector plates. The attachment is made intermediate the legs of the U-shape of guide plate 66.

Figure 7:
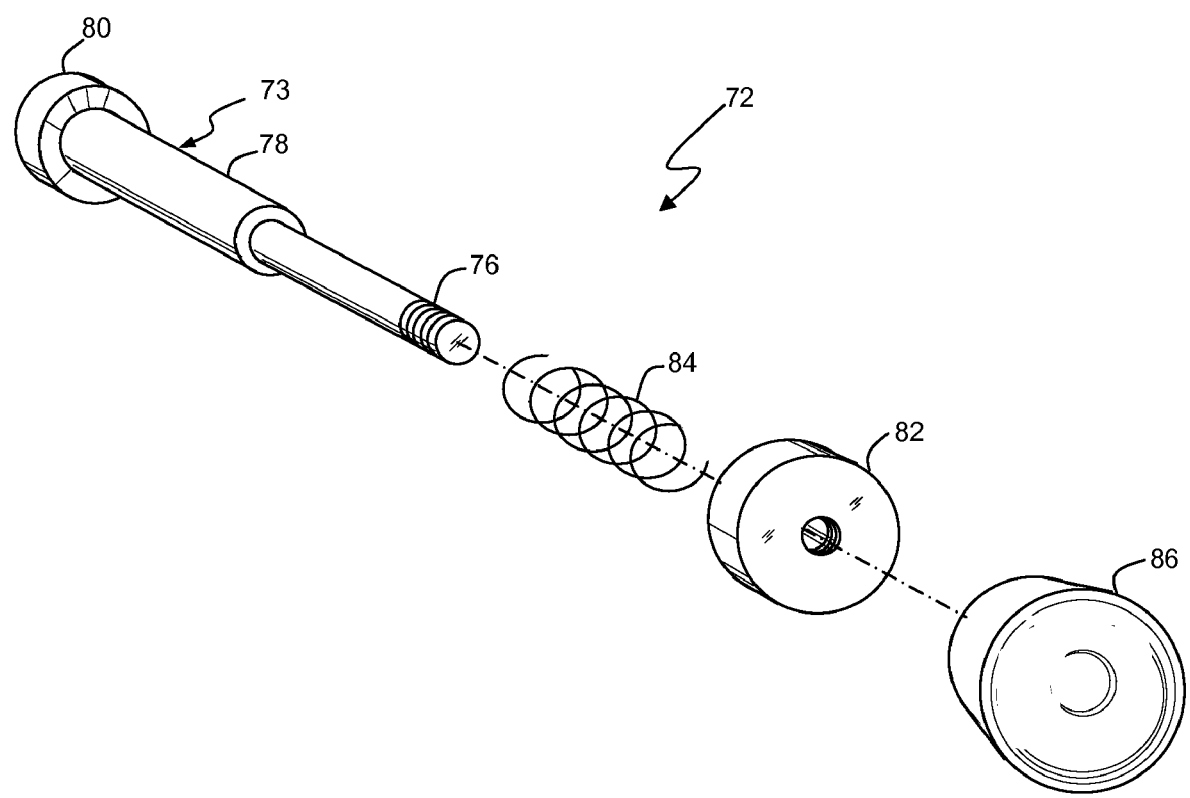
FIG. 7 is an exploded perspective view of the release button assembly of the interchangeable clipper of FIG. 1.
Figure 8:
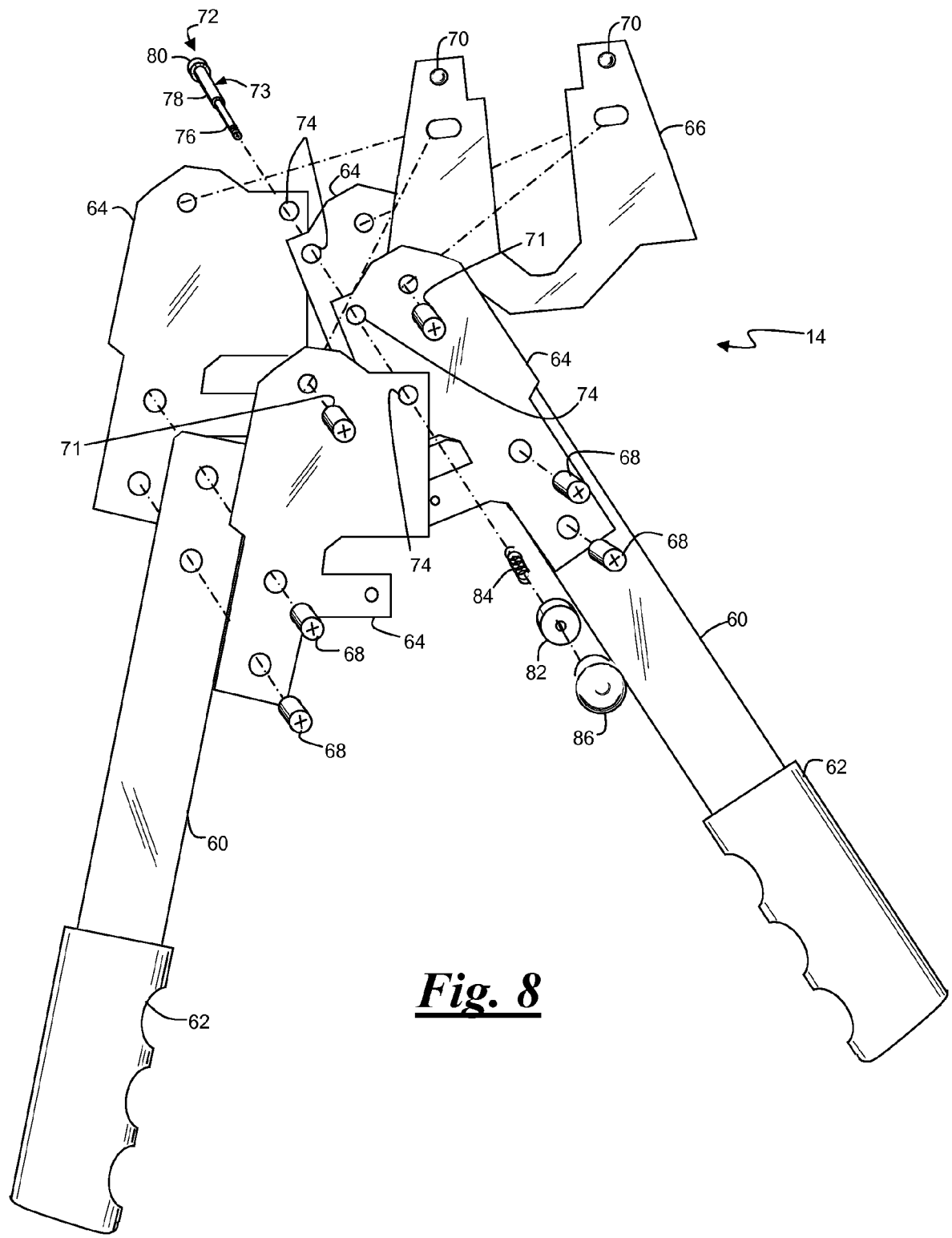
FIG. 8 is an exploded view of the actuator assembly of the interchangeable clipper of FIG. 1.

A release button 72 is inserted through apertures 74 through connector plates 64 thereby pivotally connecting the handles 60 together, as shown by FIG. 8. Release button 72 comprises a drive pin or shaft 73 having a release portion 76, a locking portion 78, and a flanged section 80, as best displayed by FIG. 7. Release portion 76 is located at a first end of release button 72 and has a diameter smaller than the width of neck portion 56 of cutting plate 18 to allow the release portion of the release button to travel through the neck section. Locking portion 78 is adjacent to release portion 76 along the length of release button 72 and has a diameter greater than the width of neck section 56 but less than that of head section 58. This width allows locking portion 78 of release button 72 to rotate within head section 58, but obstructs its removal through neck section 56. Flanged section 80 is located at the second end of release button 72 and has a diameter greater than apertures 74 through connector plates 64 to obstruct travel of the release button through the apertures. Release portion 76 and locking portion 78 have sufficient length to allow interaction with connector slot 54 of cutting plate 18, as described below. Release portion 76 has sufficient length to allow connector slot 54 to slide around the section when release button 72 is depressed into clipper 10 and is short enough to be removed from access by the connector slot when the release button is released. Locking portion 78 has sufficient length to engage head section 58 of connector slot 54 when release button 72 is released and is short enough to fully disengage the connector slot when the release button is depressed (described in greater detail below).

An element 82 is attached to the first end of release button 72 to prevent its removal from apertures 74 and a biasing element 84, such as a spring, is located between the element and the adjacent connector plate 64 to bias the release button's first end to extend away from the connector plates and to dispose locking portion 78 between the connector plates, as depicted by FIGS. 7 and 8. Element 82 may be any suitable shape, size and material sufficient to fixedly attach to release button 72, and retain the release button and spring 84 in position. Spring 84 can comprise any form of spring, and is typically a helical stainless steel spring. A cap 86, typically composed of a soft, pliable rubber or plastic is applied over element 82 to provide comfort to a user and to provide aesthetic qualities, among others.

Figure 4A:
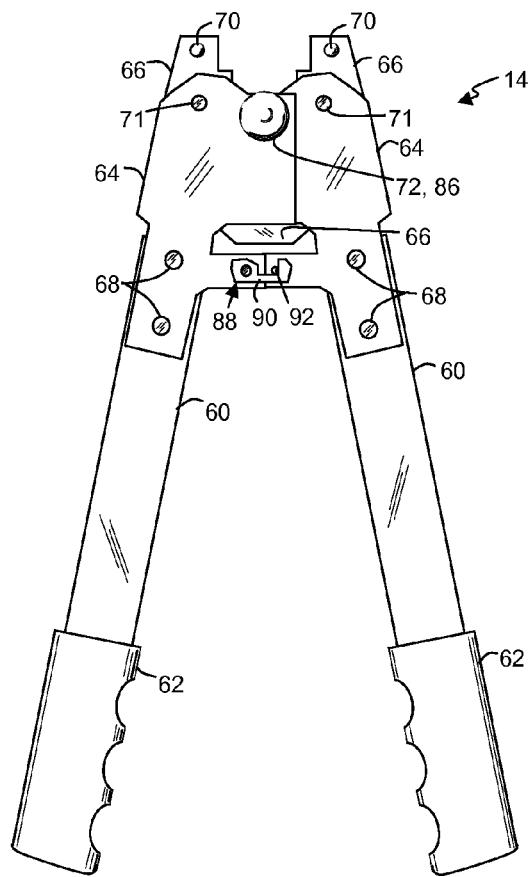
FIG. 4a is a front side elevational view of the actuator of the interchangeable clipper of FIG. 1 depicted detached from the head.
Figure 4B:
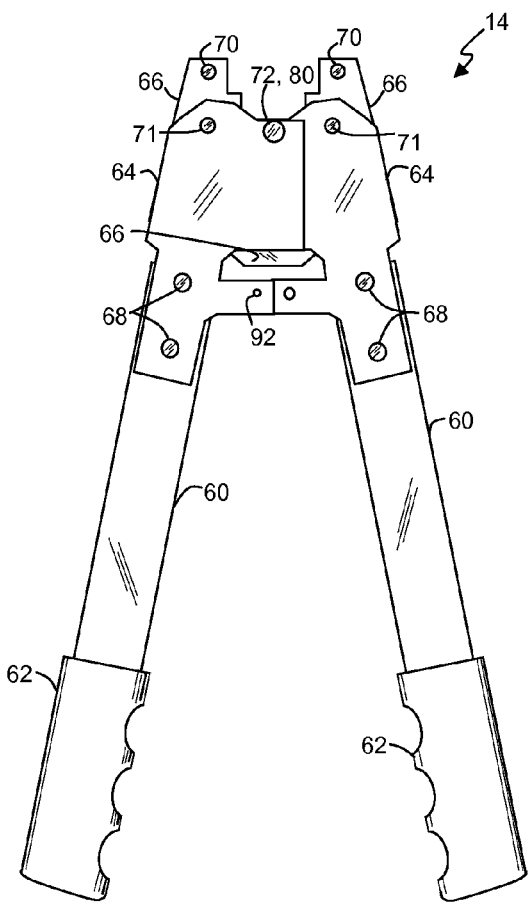
FIG. 4b is a rear side elevational view of the actuator of the interchangeable clipper of FIG. 1 depicted detached from the head.

As depicted in FIGS. 1 and 4a, a handle lock 88 may also be included between handles 60 or connector plates 64 to retain the handles in a closed position. Handle lock 88 typically comprises a rotatable, generally L-shaped member 90 located on one handle 60 and a pin 92 extending from the opposite handle. Member 90 is rotated to engage pin 92 within the L-shape to obstruct movement of the handles 60.

The components of clipper 10, described above, are typically made from a metal, such as aluminum and/or steel alloys, among other metals, unless specified otherwise, but other materials or combinations thereof may be utilized. The materials are selected to provide adequate strength to clipper 10 as well as to impart other characteristics such as, but not limited to, light weight, toughness, wear resistance, corrosion resistance, paintability, or colorability, among others. The components are also typically stamped, cut or machined, among other processes, but may be produced by any other suitable methods or combinations thereof such as casting or forging, among others. Further, any suitable form of raw materials compatible with a desired manufacturing process is useable and typically includes sheet, plate and bar stock, among others.

Referring now to FIGS. 1-8 the assembly of clipper 10 is described according to an embodiment of the present invention. Cutting head 12 is assembled having cutting plate 18 and body 16, as best depicted by FIGS. 3a-d. Cutting plate 18 is constructed by fixedly attaching cutting blade 46 to the front side of the cutting plate with fasteners 44 inserted through apertures 48 and 42. Punch pin lever 52 is fixedly attached intermediate the rear side of cutting plate 18. Cutting plate 18 is incorporated into body 16 by inserting punch pin lever 52 through slot 28 in back plate 26 and orienting the cutting plate such that cutting blades 46 extend in the direction of the top of the back plate. Fasteners 25 are inserted through apertures 30 located at each corner of back plate 26, the fasteners extending toward the front of body 16. Body 16 may then be constructed in layers from the rear moving toward the front utilizing fasteners 25 by first locating one spacer plate 33 along and adjacent to each side of cutting plate 18 and against back plate 26 using the fasteners along either side of the back plate and apertures 36. Then guide pin plate 32 is located on the bottom fasteners 25 using apertures 36 such that a portion of guide pin plate extends downward and away from body 12. Faceplate 20a is located on the top fasteners 25 using apertures 24 and faceplate 20b is located on the bottom two fasteners using the apertures. Fasteners 25 are then tightened to fixedly retain the components in place as depicted in FIGS. 3a-d. By this construction cutting plate 18 is slidably disposed within cavity 22 created by faceplates 20a and 20b and back plate 26. Movement of cutting plate 18 downward and out of cavity 22 is obstructed by guide pin plate 32 and upward and downward movement is restricted by interaction of punch pin lever 52 and slot 28. Further, channel 21 is created by portions of faceplates 20a and 20b, guide pin plate 32, spacer plates 33 and back plate 26 forming a cavity oriented across and traversing the width of cutting head 12.

Actuator 14 is assembled by inserting the first ends of handles 60 into appropriately sized cavities 94 within grips 62 as shown in FIG. 6a. The second end of each handle 60 is disposed between two connector plates 64 and fixedly attached thereto by fasteners 68 to produce two separate handles with a pair of connector plates attached thereto, as depicted by FIG. 8. Such an arrangement provides space between the connector plates 64 of a width equal to the thickness of the handle 60 to which they are attached. Guide plate 66, having a thickness generally equal to or less than that of handles 60, is also disposed within the space between adjacent connector plates 64 and is rotatably connected thereto by fulcrum pins 71 (FIG. 8). Guide plate 66 connects to each pair of connector plates 64 intermediate each leg of its U-shape, thereby linking the two separate handle 60 and connector plate assemblies. Guide plate 66 is oriented such that the legs of its U-shape point away from handles 60 and guide pins 70 extend toward the front of clipper 10. Portions of connector plates containing apertures 74 are designed to allow overlapping of the connector plates to permit alignment of the apertures while also maintaining a gap or space between the innermost connector plates. Apertures 74 in connector plates 64 are then aligned and release button 72 is inserted from the rear side of clipper 10 through the apertures (FIG. 8). Spring 84 is located around the portion of release button 72 extending from the front of clipper 10 and element 82 is fixedly attached to the end of the release button to retain the spring and release button in place. Cap 86 is then placed over element 82 (FIGS. 7 and 8).

Figure 10:
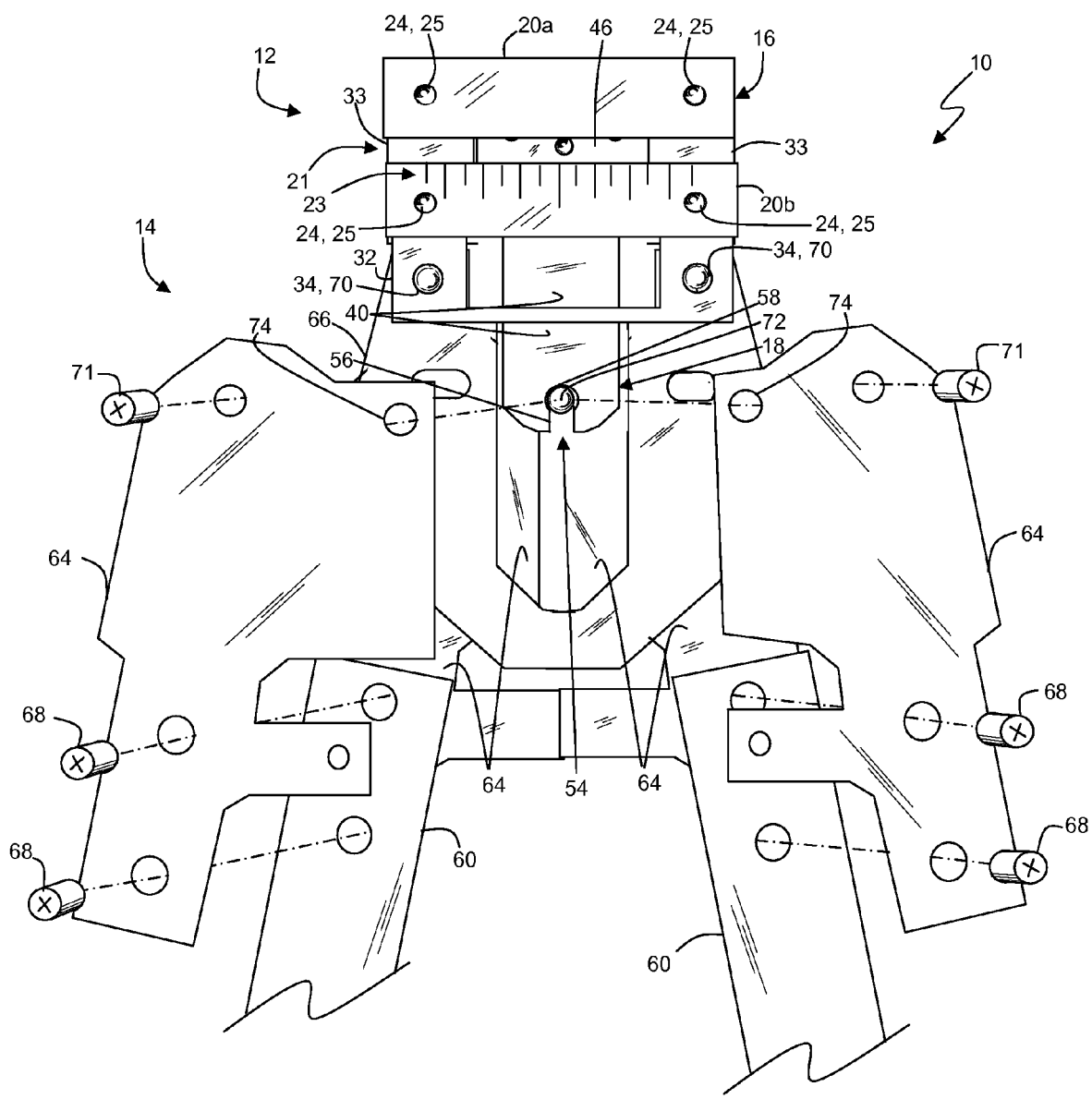
FIG. 10 is a front side, partially exploded view of the interchangeable clipper of FIG. 1 depicting the front connector plates removed for viewing the connection between the head and the actuator.

Cutting head 12 and actuator 14 may then be connected, as is depicted in FIGS. 9 and 10. Punch pin lever 52 is moved toward the top of cutting head 12 to slide cutting plate 18 upward, extending through a first cavity opening 65 (FIGS. 3a, 3d). While retaining this positioning, guide pins 70 of actuator 14 are inserted from the rear of cutting head 12 into apertures 34 (interchangeably termed "mounting apertures" 34 herein) of guide pin plate 32. Release button 72 is depressed toward the rear of actuator 14 to expose release portion 76 of the release button within the gap between the innermost connector plates 64. Punch pin lever 52 is then used to slide cutting plate 18 downward through a second cavity opening 67, causing neck 40 to insert into the gap between connector plates 64 and connector slot 54 to engage release portion 76 (FIG. 10). Release portion 76 allows neck section 56 of connector slot 54 to slot in around release button 72 and allows head section 58 to engage the release button. Release button 72 is then released permitting release portion 76 to travel out of connector slot 54 and locking portion 78 to travel into and engage the connector slot. The diameter of locking portion 78 being greater than the width of neck section 56, locks cutting plate 18 in communication with release button 72. Cutting head 12 and actuator 14 are thereby retained in communication by guide pins 70 and release button 72.

In operation, clipper 10 is typically used to clip generally rectangular portions along an edge at the end of a structural aluminum fence rail to create rail end steps according to an embodiment of the present invention. Cutting head 12 provides a channel 21 as depicted in FIGS. 1, 3*a* and 3*b*, into which one edge of a fence rail is inserted. Channel 21 is designed for application specific use and, therefore has dimensions closely approximating the profile of the specific fence rail to be clipped, such as the "J" section of a section of aluminum fence rail.

To perform a cut, handle lock 88 is first unlatched and handles 60 pulled laterally away from one another causing the handles to pivot about fulcrum pins 71. The movement of handles 60 also draws release button 72 downward toward the users hands and therefore the attached cutting plate 18 downward, thereby removing cutting blade 46 from channel 21. One edge of the fence rail is then inserted into channel 21. Measurement graduations along faceplate 20*b* may be utilized by the user to determine the length of cut to be made up to the maximum length allowed by stop 51, i.e. the fence rail can be inserted into channel 21 and against the stop to make the largest cut available or inserted any lesser amount. If a longer cut is desired, clipper 10 allows a user to make multiple adjacent cuts.

Once the fence rail is inserted into channel 21 a desired, measured distance, a cut is made by manually actuating clipper 10 by pressing handles 60 together. Such movement of handles 60 actuates release button 72, cutting plate 18 and cutting blade 46 upward through cavity 22 and into channel 21. Cutting edge 50 is thereby pressed into and cuts through the material. Cutting surface 49 provides additional cutting action and causes the cut material to be ejected from cutting head 12 through the top open end of cavity 22 (FIG. 3*d*) when the cut is complete. Body 16 and channel 21 retain and support the fence rail during the cut, thereby reducing the amount of deformation caused to the fence rail and any features thereon. Upon completion of the cut, the fence rail may be removed from channel 21 or inserted further for subsequent cuts. Only one side or edge of the fence rail is cut at a time, thus allowing a user to have cuts of differing lengths on either side of the fence rail to increase adaptability of the fence rail to angled or slanted applications on uneven ground, among other advantages.

Clipper 10 provides a material profile specific channel 21 in cutting head 12 to increase cut quality of unique and specific material profiles. Clipper 10 accommodates multiple different material profiles by permitting interchangeability of cutting head 12. Multiple cutting heads 12 are available, each for a different specific material profile, and are easily and similarly attached and detached from actuator 14. Cutting heads 12 may also be designed to accommodate various materials and for use in other applications such as, but not limited to, vinyl fencing installation, aluminum siding, and plumbing installation.

To detach cutting head 12 the reverse process of that described above is followed. Release button 72 is depressed to reintroduce release portion 76 into connector slot 54 and punch pin lever 52 is slid upward to disengage the connector slot from the release button (see FIGS. 9 and 10). Cutting head 12 is then moved toward the front of clipper 10 to disengage guide pins 70 and the cutting head removed. A different cutting head 12 may then be attached for cutting a different material profile, different material, or to replace old, worn out or lost cutting heads.

Figure 11:
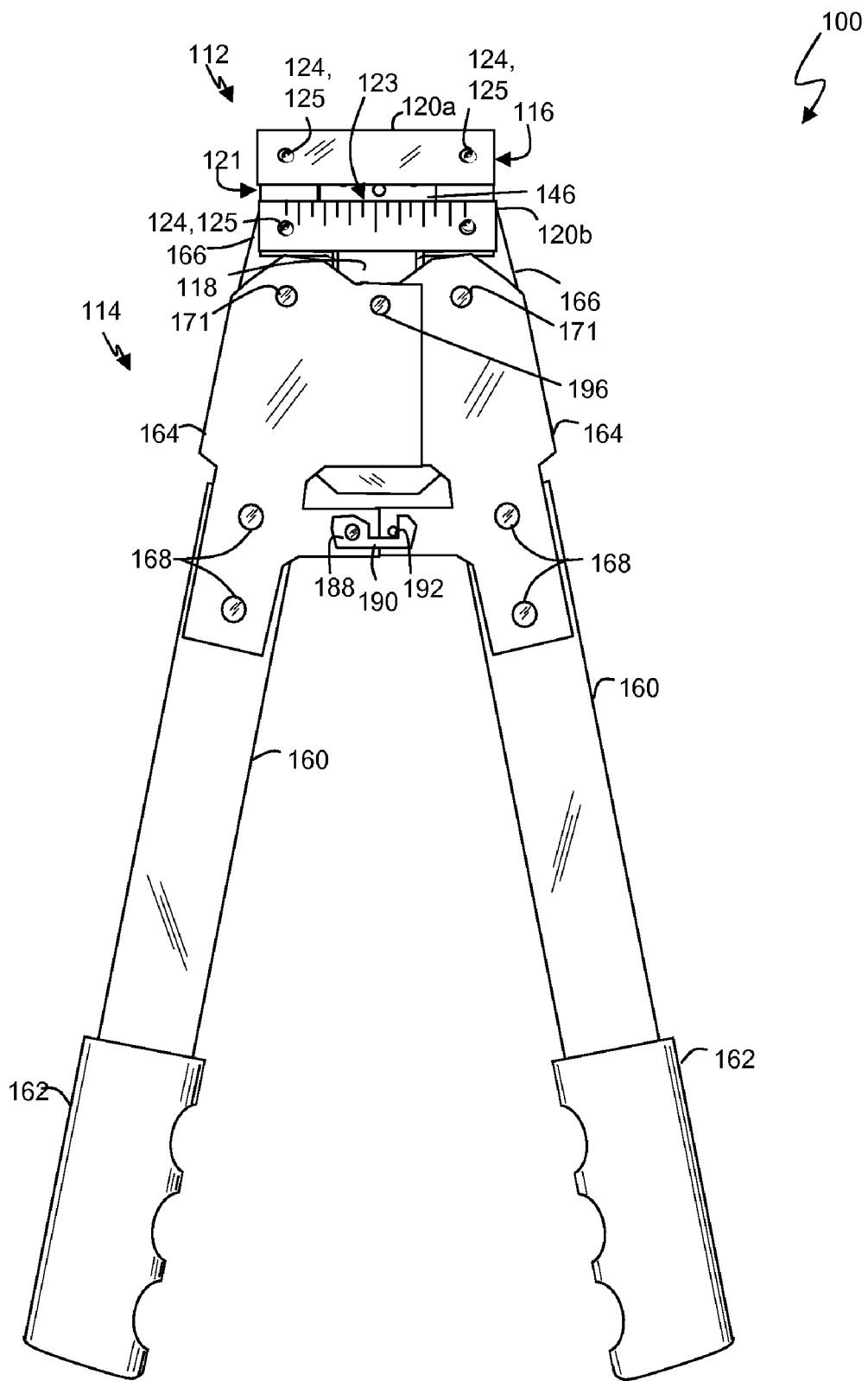
FIG. 11 is a front side elevation of a clipper according to another embodiment of the present invention.
Figure 12:
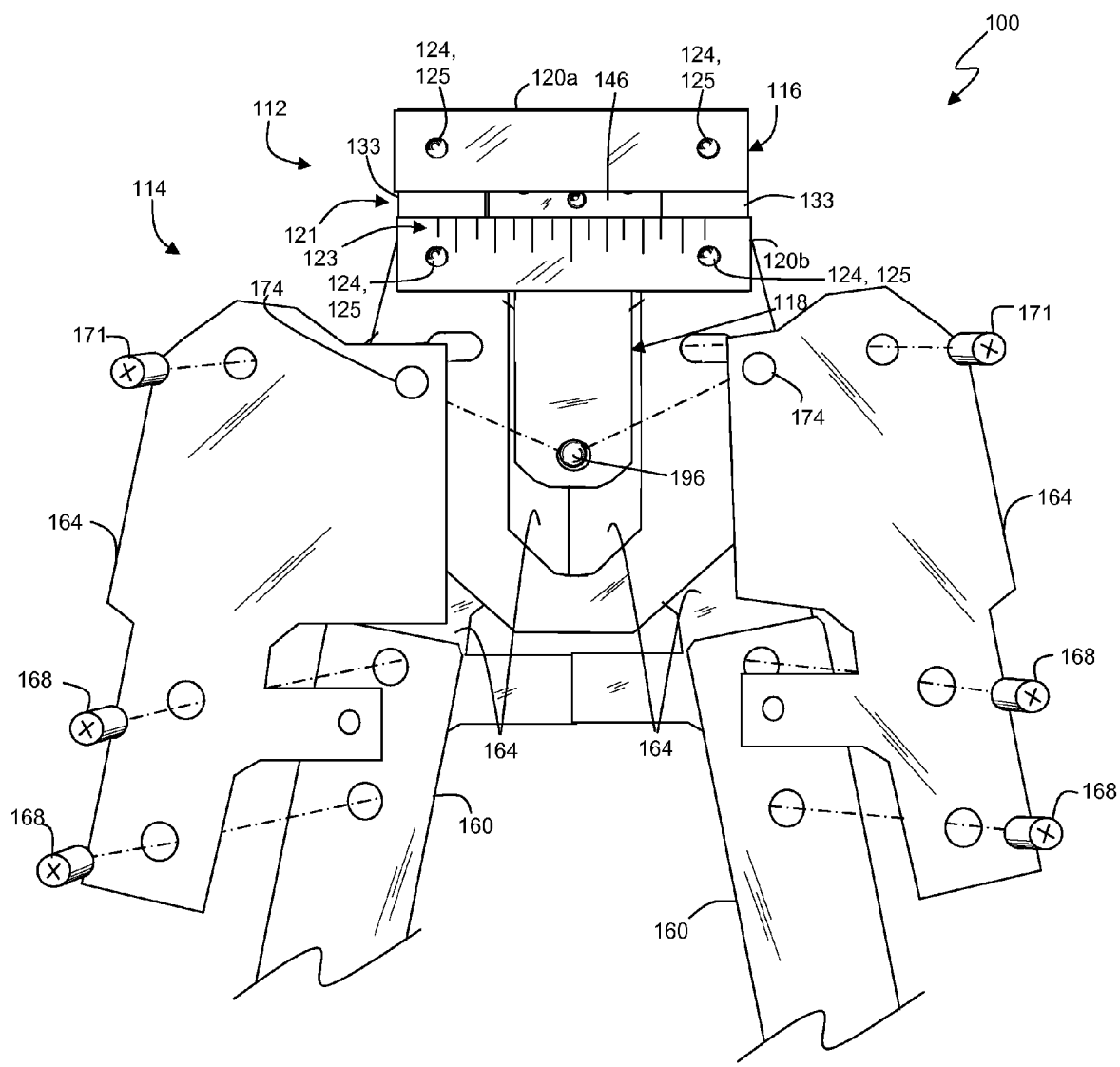
FIG. 12 is a front side, partially exploded view of the clipper of FIG. 11 depicting the front connector plates removed for viewing the connection between the head and the actuator.

Referring now to FIGS. 11 and 12, a clipper 100 is depicted according to another embodiment of the present invention. The structural profile-specific cutting functions and characteristics of clipper 10 are included in a non-interchangeable unit, clipper 100. Clipper 100 is generally constructed as described above but without the ability of interchangeable cutting head 12 to accommodate multiple structural profiles. For example, the release button 72 may be replaced with an actuator pin 196 much like that of fulcrum pins 71 and guide plate 66 replaced with guide plate 166 which is similar in structure to guide plate 66 but with extended legs that are affixed to cutting head 1 12. Guide pin plate 32 and spacer plates 33 may be omitted from cutting head 112 and their functions replaced by the extended portions of guide plate 166. Alternatively, another embodiment of cutting head 112, having a single piece body 116 or other variations of the above components, may also be utilized so long as the functional aspects of the cutting action of cutting blade 146 within cavity 122 and channel 121 are retained. Additionally, the utilization of a structural profile-specific channel 121 is maintained in order to provide a good quality, clean cut without causing unwanted deformation to the surrounding material.

Figure 13A:
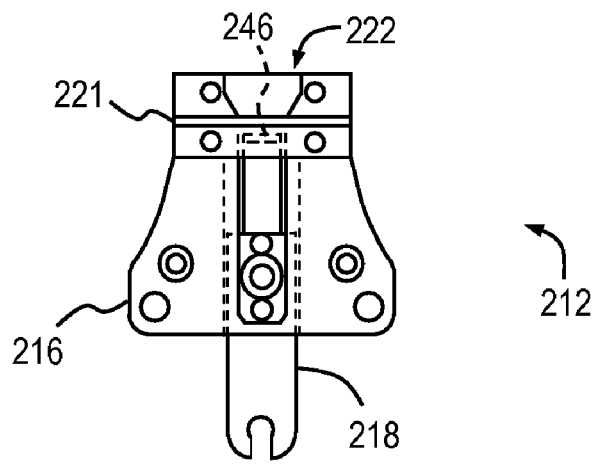
FIG. 13A depicts a cutting head according to another embodiment of the present invention with a cutter plate of the cutting head shown in a retracted position.
Figure 13B:
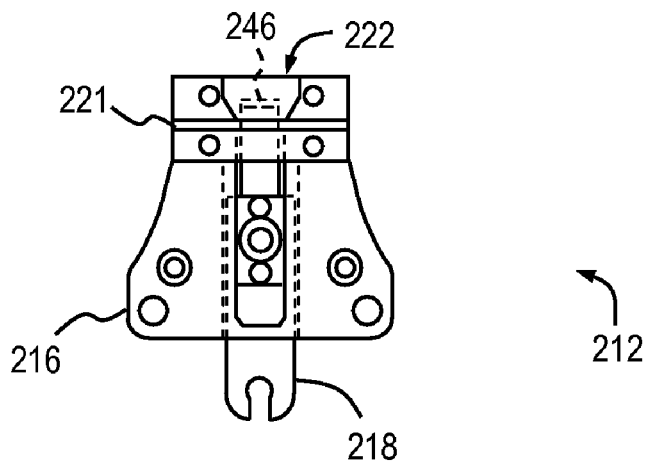
FIG. 13B shows the cutting head of FIG. 13A with the cutter plate in a cutting position.
Figure 13C:
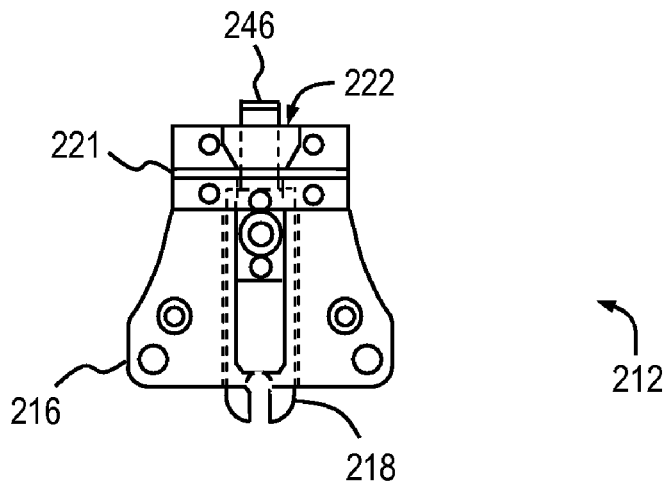
FIG. 13C shows the cutting head of FIG. 13A with the cutter plate in a fully-extended position.

A head 212 is shown in FIGS. 13A, 13B and 13C according to another embodiment of the present invention. Head 212 is similar in structure and function to heads 12, 112, wherein a cutter plate 218 is captively and slidably disposed within a body 216. Cutter plate 218 includes a punch 246 configured to selectably slidably extend into a cavity 222, moving generally perpendicularly to a channel 221. With general reference to FIGS. 1 and 13A, in operation head 212 is detachably mounted to an actuator 14 in the manner previously described for heads 12, 112. A material to be punched is inserted into channel 221 with handles 60 in an open, spread-apart position with respect to each other. With general reference to FIGS. 1 and 13B, handles 60 are then pivoted toward each other, urging punch 246 through the material and into cavity 222, thereby punching an aperture in the material corresponding to the shape of punch 246. In various embodiments punch 246 may be shaped to form apertures having various shapes and sizes. Examples include, without limitation, square, rectangular, circular and polygonal apertures. Cutter plate 218 may be moved to a fully-extended position as shown in FIG. 13C to facilitate removal of head 212 from actuator 14, which is accomplished in the same manner as described above for heads 12, 112. The structure and function of the remaining components of head 212 are substantially the same as heads 12, 112 and thus will not be reiterated here.

As can be seen from the foregoing, the embodiments of the present invention solve a number of the shortcomings of tools in the art. For example, with reference to FIGS. 1 and 11, heads 12, 112, 212 are easily coupled to actuators 14, 114 respectively without the need to resort to tools. Likewise, heads 12, 112, 212 maybe detached from actuators 14, 114 respectively without the use of tools. Thus, tools 10, 100 may be conveniently configured for cutting a variety of structural materials by changing heads 12, 112, 212 respectively to a head configured to cut a particular shape or type of structural material. This is particularly beneficial when tools 10, 100 are in use at a remote location where adjustment tools are inconvenient to use or are unavailable.

While this invention has been shown and described with respect to a detailed embodiment thereof, it will be understood by those skilled in the art that changes in form and detail thereof may be made without departing from the scope of the claims of the invention. For example, one skilled in the art will recognize that the components of heads 12, 112, 212 may be shaped and arranged to cut or punch one or more predetermined shapes in or through structural materials having various shapes and profiles.

What is claimed is:

1. A tool for cutting structural materials, comprising:
   a guide plate having a pair of fixed, spaced-apart connector pins extending therefrom;
   a pair of handles, each handle including a connector plate movably coupled to the guide plate;
   a drive pin pivotally coupled to the connector plates, the drive pin being movable generally linearly as the handles are pivoted;
   a detachable cutting head comprising a body, the body including a cavity having a first cavity opening, a second, opposing cavity opening and a channel configured to receive a structural material workpiece;
   a mounting flange coupled to the body, the mounting flange including a pair of spaced-apart mounting apertures; and
   a cutting plate slidably disposed in the cavity, the cutting plate having a connector slot and being movable within the cavity to selectably extend through the first cavity opening,
   wherein the mounting apertures of the mounting flange are each configured to detachably fit over corresponding connector pins of the guide plate and the connector slot of the cutting plate is configured to extend through the second cavity opening and detachably engage the drive pin, the cutting plate being positionable to extend through the first cavity opening when the cutting head is attached to, and detached from, the handles, and
   wherein the cutting plate is configured to move slidably in the body as the handles are pivoted, effective to cut a structural material workpiece when the workpiece is inserted into the channel of the body, a cut portion of said structural material being ejectable through the first cavity opening.

2. The tool of claim 1 wherein the drive pin comprises a locking portion and a release portion.

3. The tool of claim 2 wherein the drive pin further comprises a biasing element to releasably urge the drive pin to a locking position.

4. The tool of claim 2 wherein the connector slot of the cutting plate is generally keyhole-shaped.

5. The tool of claim 1 wherein the cutting plate further comprises a cutting blade.

6. The tool of claim 5 wherein the blade further comprises a stop.

7. The tool of claim 1 wherein the channel of the body is shaped to receive a structural material workpiece having a predetermined shape.

8. The tool of claim 1 wherein the drive pin further comprises a cap.

9. The tool of claim 1 wherein the cutting plate further comprises a lever slidably disposed in the body.

10. The tool of claim 9 wherein the cutting plate is captively slidably retained in the body by the lever.

11. The tool of claim 1 wherein the body includes measurement graduations.

12. The tool of claim 1, further comprising a handle lock.

13. The tool of claim 1, further comprising a grip coupled to an end of each handle.

14. A tool for cutting structural materials, comprising:
   a guide plate having a pair of fixed, spaced-apart connector pins extending therefrom;
   a pair of handles, each handle including a connector plate movably coupled to the guide plate;
   a drive pin pivotally coupled to the connector plates, the drive pin being movable generally linearly as the handles are pivoted;
   a detachable cutting head comprising a body, the body including a cavity having a first cavity opening, a second, opposing cavity opening and a channel configured to receive a structural material workpiece having a predetermined shape;
   a mounting flange coupled to the body, the mounting flange including a pair of spaced-apart mounting apertures; and
   a cutting plate captively slidably disposed in the cavity, the cutting plate having a connector slot and a cutting blade, the cutting plate being movable within the cavity to selectably extend through the first cavity opening,
   wherein the mounting apertures of the mounting flange are each configured to detachably fit over corresponding connector pins of the guide plate and the connector slot of the cutting plate is configured to extend through the second cavity opening and detachably engage the drive pin, the cutting plate being positionable to extend through the first cavity opening when the cutting head is attached to, and detached from, the handles, and
   wherein the cutting plate is configured to move slidably in the body as the handles are pivoted, effective to cut a structural material workpiece when the workpiece is inserted into the channel of the body, a cut portion of said structural material being ejectable through the first cavity opening.

* * * * *

UNITED STATES PATENT AND TRADEMARK OFFICE
CERTIFICATE OF CORRECTION

PATENT NO. : 7,637,017 B2 Page 1 of 1
APPLICATION NO. : 11/683077
DATED : December 29, 2009
INVENTOR(S) : Todd Retterer and Donald Drown It is certified that error appears in the above-identified patent and that said Letters Patent is hereby corrected as shown below:

On the title page, item (74), "Michael A. Forham" should be --Michael A. Forhan--.

Column 10, line 20, replace "1 12" with --112--.

Signed and Sealed this

Sixteenth Day of March, 2010

David J. Kappos
*Director of the United States Patent and Trademark Office*